US008228224B2

(12) United States Patent
Kortum et al.

(10) Patent No.: US 8,228,224 B2
(45) Date of Patent: Jul. 24, 2012

(54) SYSTEM AND METHOD OF USING A REMOTE CONTROL AND APPARATUS

(75) Inventors: Philip Ted Kortum, Austin, TX (US); Marc Andrew Sullivan, Austin, TX (US); Jeffrey Lewis Brandt, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1081 days.

(21) Appl. No.: 11/924,757

(22) Filed: Oct. 26, 2007

(65) Prior Publication Data

US 2008/0100492 A1 May 1, 2008

Related U.S. Application Data

(63) Continuation of application No. 11/049,629, filed on Feb. 2, 2005, now Pat. No. 7,307,574.

(51) Int. Cl.
*H04L 17/12* (2006.01)

(52) U.S. Cl. .......... 341/176; 341/20; 341/174; 341/175; 348/14.05

(58) Field of Classification Search .................... 341/20, 341/174, 175, 176; 348/14.05, 734; 340/825.69, 340/825.72
See application file for complete search history.

(56) References Cited

U.S. PATENT DOCUMENTS

| | | | |
|---|---|---|---|
| 4,243,147 | A | 1/1981 | Twitchell et al. |
| 4,356,509 | A | 10/1982 | Skerlos et al. |
| 4,768,926 | A | 9/1988 | Gilbert, Jr. |
| 4,907,079 | A | 3/1990 | Turner et al. |
| 5,126,731 | A | 6/1992 | Cromer, Jr. et al. |
| 5,163,340 | A | 11/1992 | Bender |
| 5,475,835 | A | 12/1995 | Hickey |
| 5,532,748 | A | 7/1996 | Naimpally |
| 5,541,917 | A | 7/1996 | Farris |
| 5,589,892 | A | 12/1996 | Knee et al. |
| 5,592,477 | A | 1/1997 | Farris et al. |
| 5,610,916 | A | 3/1997 | Kostreski et al. |
| 5,613,012 | A | 3/1997 | Hoffman et al. |
| 5,650,831 | A | 7/1997 | Farwell |
| 5,651,332 | A | 7/1997 | Moore et al. |
| 5,656,898 | A | 8/1997 | Kalina |
| 5,675,390 | A | 10/1997 | Schindler et al. |
| 5,708,961 | A | 1/1998 | Hylton et al. |

(Continued)

FOREIGN PATENT DOCUMENTS

WO 99/63759 A2 12/1999

(Continued)

OTHER PUBLICATIONS

International Search Report and Written Opinion of the International Searching Authority for International Application No. PCT/US06/00759, Mailed on Jun. 5, 2007.

(Continued)

*Primary Examiner* — Albert Wong
(74) *Attorney, Agent, or Firm* — Toler Law Group, PC

(57) ABSTRACT

A method includes receiving a first identification signal, where the first identification signal corresponds to a first control. The method also includes determining an active device function to which the first control corresponds, where the active device function is a first function of a first device when the first device is active and where the active device function is a second function of a second device when the second device is active. The method also includes triggering emission of an audible signal identifying the active device function.

20 Claims, 8 Drawing Sheets

U.S. PATENT DOCUMENTS

| | | | |
|---|---|---|---|
| 5,722,041 | A | 2/1998 | Freadman |
| 5,724,106 | A | 3/1998 | Autry et al. |
| 5,729,825 | A | 3/1998 | Kostreski et al. |
| 5,734,853 | A | 3/1998 | Hendricks et al. |
| 5,774,357 | A | 6/1998 | Hoffberg et al. |
| 5,793,438 | A | 8/1998 | Bedard |
| 5,805,719 | A | 9/1998 | Pare, Jr. et al. |
| 5,818,438 | A | 10/1998 | Howe et al. |
| 5,838,384 | A | 11/1998 | Schindler et al. |
| 5,838,812 | A | 11/1998 | Pare, Jr. et al. |
| 5,864,757 | A | 1/1999 | Parker |
| 5,867,223 | A | 2/1999 | Schindler et al. |
| 5,892,508 | A | 4/1999 | Howe et al. |
| 5,900,867 | A | 5/1999 | Schindler et al. |
| 5,910,970 | A | 6/1999 | Lu |
| 5,933,498 | A | 8/1999 | Schneck et al. |
| 5,953,318 | A | 9/1999 | Nattkemper et al. |
| 5,956,024 | A | 9/1999 | Strickland et al. |
| 5,956,716 | A | 9/1999 | Kenner et al. |
| 5,970,088 | A | 10/1999 | Chen |
| 5,987,061 | A | 11/1999 | Chen |
| 5,990,927 | A | 11/1999 | Hendricks et al. |
| 5,995,155 | A | 11/1999 | Schindler et al. |
| 5,999,518 | A | 12/1999 | Nattkemper et al. |
| 5,999,563 | A | 12/1999 | Polley et al. |
| 6,002,722 | A | 12/1999 | Wu |
| 6,014,184 | A | 1/2000 | Knee et al. |
| 6,021,158 | A | 2/2000 | Schurr et al. |
| 6,021,167 | A | 2/2000 | Wu |
| 6,028,600 | A | 2/2000 | Rosin et al. |
| 6,029,045 | A | 2/2000 | Picco et al. |
| 6,038,251 | A | 3/2000 | Chen |
| 6,044,107 | A | 3/2000 | Gatherer et al. |
| 6,052,120 | A | 4/2000 | Nahi et al. |
| 6,055,268 | A | 4/2000 | Timm et al. |
| 6,072,483 | A | 6/2000 | Rosin et al. |
| 6,084,584 | A | 7/2000 | Nahi et al. |
| 6,111,582 | A | 8/2000 | Jenkins |
| 6,118,498 | A | 9/2000 | Reitmeier |
| 6,122,660 | A | 9/2000 | Baransky et al. |
| 6,124,799 | A | 9/2000 | Parker |
| 6,137,839 | A | 10/2000 | Mannering et al. |
| 6,166,734 | A | 12/2000 | Nahi et al. |
| 6,181,335 | B1 | 1/2001 | Hendricks et al. |
| 6,192,282 | B1 | 2/2001 | Smith et al. |
| 6,195,692 | B1 | 2/2001 | Hsu |
| 6,215,483 | B1 | 4/2001 | Zigmond |
| 6,237,022 | B1 | 5/2001 | Bruck et al. |
| 6,243,366 | B1 | 6/2001 | Bradley et al. |
| 6,252,588 | B1 | 6/2001 | Dawson |
| 6,252,989 | B1 | 6/2001 | Geisler et al. |
| 6,260,192 | B1 | 7/2001 | Rosin et al. |
| 6,269,394 | B1 | 7/2001 | Kenner et al. |
| 6,275,268 | B1 | 8/2001 | Ellis et al. |
| 6,275,989 | B1 | 8/2001 | Broadwin et al. |
| 6,281,813 | B1 | 8/2001 | Vierthaler et al. |
| 6,286,142 | B1 | 9/2001 | Ehreth |
| 6,295,057 | B1 | 9/2001 | Rosin et al. |
| 6,311,214 | B1 | 10/2001 | Rhoads |
| 6,314,409 | B2 | 11/2001 | Schneck et al. |
| 6,344,882 | B1 | 2/2002 | Shim et al. |
| 6,357,043 | B1 | 3/2002 | Ellis et al. |
| 6,359,636 | B1 | 3/2002 | Schindler et al. |
| 6,363,149 | B1 | 3/2002 | Candelore |
| 6,385,693 | B1 | 5/2002 | Gerszberg et al. |
| 6,396,480 | B1 | 5/2002 | Schindler et al. |
| 6,396,531 | B1 | 5/2002 | Gerszberg et al. |
| 6,396,544 | B1 | 5/2002 | Schindler et al. |
| 6,397,387 | B1 | 5/2002 | Rosin et al. |
| 6,400,407 | B1 | 6/2002 | Zigmond et al. |
| 6,411,307 | B1 | 6/2002 | Rosin et al. |
| 6,442,285 | B2 | 8/2002 | Rhoads et al. |
| 6,442,549 | B1 | 8/2002 | Schneider |
| 6,449,601 | B1 | 9/2002 | Freidland et al. |
| 6,450,407 | B1 | 9/2002 | Freeman et al. |
| 6,460,075 | B2 | 10/2002 | Krueger et al. |
| 6,463,585 | B1 | 10/2002 | Hendricks et al. |
| 6,481,011 | B1 | 11/2002 | Lemmons |
| 6,486,892 | B1 | 11/2002 | Stern |
| 6,492,913 | B2 | 12/2002 | Vierthaler et al. |
| 6,496,983 | B1 | 12/2002 | Schindler et al. |
| 6,502,242 | B1 | 12/2002 | Howe et al. |
| 6,505,348 | B1 | 1/2003 | Knowles et al. |
| 6,510,519 | B2 | 1/2003 | Wasilewski et al. |
| 6,515,680 | B1 | 2/2003 | Hendricks et al. |
| 6,516,467 | B1 | 2/2003 | Schindler et al. |
| 6,519,011 | B1 | 2/2003 | Shendar |
| 6,522,769 | B1 | 2/2003 | Rhoads et al. |
| 6,526,577 | B1 | 2/2003 | Knudson et al. |
| 6,529,949 | B1 | 3/2003 | Getsin et al. |
| 6,535,590 | B2 | 3/2003 | Tidwell et al. |
| 6,538,704 | B1 | 3/2003 | Grabb et al. |
| 6,542,740 | B1 | 4/2003 | Olgaard et al. |
| 6,557,030 | B1 | 4/2003 | Hoang |
| 6,563,430 | B1 | 5/2003 | Kemink et al. |
| 6,567,982 | B1 | 5/2003 | Howe et al. |
| 6,574,083 | B1 | 6/2003 | Krass et al. |
| 6,587,873 | B1 | 7/2003 | Nobakht et al. |
| 6,598,231 | B1 | 7/2003 | Basawapatna et al. |
| 6,599,199 | B1 | 7/2003 | Hapshie |
| 6,607,136 | B1 | 8/2003 | Atsmon et al. |
| 6,609,253 | B1 | 8/2003 | Swix et al. |
| 6,611,537 | B1 | 8/2003 | Edens et al. |
| 6,614,987 | B1 | 9/2003 | Ismail et al. |
| 6,622,148 | B1 | 9/2003 | Noble et al. |
| 6,622,307 | B1 | 9/2003 | Ho |
| 6,631,523 | B1 | 10/2003 | Matthews, III et al. |
| 6,640,239 | B1 | 10/2003 | Gidwani |
| 6,643,495 | B1 | 11/2003 | Gallery et al. |
| 6,643,684 | B1 | 11/2003 | Malkin et al. |
| 6,650,761 | B1 | 11/2003 | Rodriguez et al. |
| 6,658,568 | B1 | 12/2003 | Ginter et al. |
| 6,678,215 | B1 | 1/2004 | Treyz et al. |
| 6,678,733 | B1 | 1/2004 | Brown et al. |
| 6,690,392 | B1 | 2/2004 | Wugoski |
| 6,693,236 | B1 | 2/2004 | Gould et al. |
| 6,701,523 | B1 | 3/2004 | Hancock et al. |
| 6,704,931 | B1 | 3/2004 | Schaffer et al. |
| 6,714,264 | B1 | 3/2004 | Kempisty |
| 6,725,281 | B1 | 4/2004 | Zintel et al. |
| 6,731,393 | B1 | 5/2004 | Currans et al. |
| 6,732,179 | B1 | 5/2004 | Brown et al. |
| 6,745,223 | B1 | 6/2004 | Nobakht et al. |
| 6,745,392 | B1 | 6/2004 | Basawapatna et al. |
| 6,754,206 | B1 | 6/2004 | Nattkemper et al. |
| 6,756,997 | B1 | 6/2004 | Ward, III et al. |
| 6,760,918 | B2 | 7/2004 | Rodriguez et al. |
| 6,763,226 | B1 | 7/2004 | McZeal, Jr. |
| 6,765,557 | B1 | 7/2004 | Segal et al. |
| 6,766,305 | B1 | 7/2004 | Fucarile et al. |
| 6,769,128 | B1 | 7/2004 | Knee et al. |
| 6,771,317 | B2 | 8/2004 | Ellis et al. |
| 6,773,344 | B1 | 8/2004 | Gabai et al. |
| 6,778,559 | B2 | 8/2004 | Hyakutake |
| 6,779,004 | B1 | 8/2004 | Zintel |
| 6,781,518 | B1 | 8/2004 | Hayes et al. |
| 6,784,804 | B1 | 8/2004 | Hayes et al. |
| 6,785,716 | B1 | 8/2004 | Nobakht et al. |
| 6,788,709 | B1 | 9/2004 | Hyakutake |
| 6,804,824 | B1 | 10/2004 | Potrebic et al. |
| 6,826,775 | B1 | 11/2004 | Howe et al. |
| 6,828,993 | B1 | 12/2004 | Hendricks et al. |
| 6,909,874 | B2 | 6/2005 | Holtz et al. |
| 6,938,021 | B2 | 8/2005 | Shear et al. |
| 7,310,807 | B2 | 12/2007 | Pearson |
| 7,436,346 | B2 | 10/2008 | Walter |
| 7,474,359 | B2 | 1/2009 | Sullivan et al. |
| 2001/0011261 | A1 | 8/2001 | Mullen-Schultz |
| 2001/0016945 | A1 | 8/2001 | Inoue |
| 2001/0016946 | A1 | 8/2001 | Inoue |
| 2001/0034664 | A1 | 10/2001 | Brunson |
| 2001/0044794 | A1 | 11/2001 | Nasr et al. |
| 2001/0048677 | A1 | 12/2001 | Boys |
| 2001/0049826 | A1 | 12/2001 | Wilf |
| 2001/0054008 | A1 | 12/2001 | Miller et al. |
| 2001/0054009 | A1 | 12/2001 | Miller et al. |
| 2001/0054067 | A1 | 12/2001 | Miller et al. |

| | | | |
|---|---|---|---|
| 2001/0056350 | A1 | 12/2001 | Calderone et al. |
| 2002/0001303 | A1 | 1/2002 | Boys |
| 2002/0001310 | A1 | 1/2002 | Mai et al. |
| 2002/0002496 | A1 | 1/2002 | Miller et al. |
| 2002/0003166 | A1 | 1/2002 | Miller et al. |
| 2002/0007307 | A1 | 1/2002 | Miller et al. |
| 2002/0007313 | A1 | 1/2002 | Mai et al. |
| 2002/0007485 | A1 | 1/2002 | Rodriguez et al. |
| 2002/0010639 | A1 | 1/2002 | Howey et al. |
| 2002/0010745 | A1 | 1/2002 | Schneider |
| 2002/0010935 | A1 | 1/2002 | Sitnik |
| 2002/0016736 | A1 | 2/2002 | Cannon et al. |
| 2002/0022963 | A1 | 2/2002 | Miller et al. |
| 2002/0022970 | A1 | 2/2002 | Noll et al. |
| 2002/0022992 | A1 | 2/2002 | Miller et al. |
| 2002/0022993 | A1 | 2/2002 | Miller et al. |
| 2002/0022994 | A1 | 2/2002 | Miller et al. |
| 2002/0022995 | A1 | 2/2002 | Miller et al. |
| 2002/0023959 | A1 | 2/2002 | Miller et al. |
| 2002/0026357 | A1 | 2/2002 | Miller et al. |
| 2002/0026358 | A1 | 2/2002 | Miller et al. |
| 2002/0026369 | A1 | 2/2002 | Miller et al. |
| 2002/0026475 | A1 | 2/2002 | Marmor |
| 2002/0029181 | A1 | 3/2002 | Miller et al. |
| 2002/0030105 | A1 | 3/2002 | Miller et al. |
| 2002/0032603 | A1 | 3/2002 | Yeiser |
| 2002/0035404 | A1 | 3/2002 | Ficco et al. |
| 2002/0040475 | A1 | 4/2002 | Yap et al. |
| 2002/0042915 | A1 | 4/2002 | Kubischta et al. |
| 2002/0046093 | A1 | 4/2002 | Miller et al. |
| 2002/0049635 | A1 | 4/2002 | Mai et al. |
| 2002/0054087 | A1 | 5/2002 | Noll et al. |
| 2002/0054750 | A1 | 5/2002 | Ficco et al. |
| 2002/0059163 | A1 | 5/2002 | Smith |
| 2002/0059425 | A1 | 5/2002 | Belfiore et al. |
| 2002/0059599 | A1 | 5/2002 | Schein et al. |
| 2002/0065717 | A1 | 5/2002 | Miller et al. |
| 2002/0067438 | A1 | 6/2002 | Baldock |
| 2002/0069220 | A1 | 6/2002 | Tran |
| 2002/0069282 | A1 | 6/2002 | Reisman |
| 2002/0069294 | A1 | 6/2002 | Herkersdorf et al. |
| 2002/0072970 | A1 | 6/2002 | Miller et al. |
| 2002/0078442 | A1 | 6/2002 | Reyes et al. |
| 2002/0097261 | A1 | 7/2002 | Gottfurcht et al. |
| 2002/0106119 | A1 | 8/2002 | Foran et al. |
| 2002/0112239 | A1 | 8/2002 | Goldman |
| 2002/0116392 | A1 | 8/2002 | McGrath et al. |
| 2002/0124055 | A1 | 9/2002 | Reisman |
| 2002/0128061 | A1 | 9/2002 | Blanco |
| 2002/0129094 | A1 | 9/2002 | Reisman |
| 2002/0133402 | A1 | 9/2002 | Faber et al. |
| 2002/0138840 | A1 | 9/2002 | Schein et al. |
| 2002/0152264 | A1 | 10/2002 | Yamasaki |
| 2002/0169611 | A1 | 11/2002 | Guerra et al. |
| 2002/0170063 | A1 | 11/2002 | Ansari et al. |
| 2002/0173344 | A1 | 11/2002 | Cupps et al. |
| 2002/0188955 | A1 | 12/2002 | Thompson et al. |
| 2002/0193997 | A1 | 12/2002 | Fitzpatrick et al. |
| 2002/0194601 | A1 | 12/2002 | Perkes et al. |
| 2002/0198874 | A1 | 12/2002 | Nasr et al. |
| 2003/0005445 | A1 | 1/2003 | Schein et al. |
| 2003/0009771 | A1 | 1/2003 | Chang |
| 2003/0012365 | A1 | 1/2003 | Goodman |
| 2003/0014750 | A1 | 1/2003 | Kamen |
| 2003/0018975 | A1 | 1/2003 | Stone |
| 2003/0023435 | A1 | 1/2003 | Josephson |
| 2003/0023440 | A1 | 1/2003 | Chu |
| 2003/0028890 | A1 | 2/2003 | Swart et al. |
| 2003/0033416 | A1 | 2/2003 | Schwartz |
| 2003/0043915 | A1 | 3/2003 | Costa et al. |
| 2003/0046091 | A1 | 3/2003 | Arneson et al. |
| 2003/0046689 | A1 | 3/2003 | Gaos |
| 2003/0056223 | A1 | 3/2003 | Costa et al. |
| 2003/0058277 | A1 | 3/2003 | Bowman-Amuah |
| 2003/0061611 | A1 | 3/2003 | Pendakur |
| 2003/0071792 | A1 | 4/2003 | Safadi |
| 2003/0093793 | A1 | 5/2003 | Gutta |
| 2003/0100340 | A1 | 5/2003 | Cupps et al. |
| 2003/0110161 | A1 | 6/2003 | Schneider |
| 2003/0110503 | A1 | 6/2003 | Perkes |
| 2003/0126136 | A1 | 7/2003 | Omoigui |
| 2003/0135771 | A1 | 7/2003 | Cupps et al. |
| 2003/0141987 | A1 | 7/2003 | Hayes |
| 2003/0145321 | A1 | 7/2003 | Bates et al. |
| 2003/0149989 | A1 | 8/2003 | Hunter et al. |
| 2003/0153353 | A1 | 8/2003 | Cupps et al. |
| 2003/0153354 | A1 | 8/2003 | Cupps et al. |
| 2003/0159026 | A1 | 8/2003 | Cupps et al. |
| 2003/0160830 | A1 | 8/2003 | DeGross |
| 2003/0163601 | A1 | 8/2003 | Cupps et al. |
| 2003/0163666 | A1 | 8/2003 | Cupps et al. |
| 2003/0172380 | A1 | 9/2003 | Kikinis |
| 2003/0182237 | A1 | 9/2003 | Costa et al. |
| 2003/0182420 | A1 | 9/2003 | Jones et al. |
| 2003/0185232 | A1 | 10/2003 | Moore et al. |
| 2003/0187641 | A1 | 10/2003 | Moore et al. |
| 2003/0187646 | A1 | 10/2003 | Smyers et al. |
| 2003/0187800 | A1 | 10/2003 | Moore et al. |
| 2003/0189509 | A1 | 10/2003 | Hayes et al. |
| 2003/0189589 | A1 | 10/2003 | LeBlanc et al. |
| 2003/0194141 | A1 | 10/2003 | Kortum et al. |
| 2003/0194142 | A1 | 10/2003 | Kortum et al. |
| 2003/0208396 | A1 | 11/2003 | Miller et al. |
| 2003/0208758 | A1 | 11/2003 | Schein et al. |
| 2003/0226044 | A1 | 12/2003 | Cupps et al. |
| 2003/0226145 | A1 | 12/2003 | Marsh |
| 2003/0229900 | A1 | 12/2003 | Reisman |
| 2004/0003041 | A1 | 1/2004 | Moore et al. |
| 2004/0003403 | A1 | 1/2004 | Marsh |
| 2004/0006769 | A1 | 1/2004 | Ansari et al. |
| 2004/0006772 | A1 | 1/2004 | Ansari et al. |
| 2004/0010602 | A1 | 1/2004 | Van Vleck et al. |
| 2004/0015997 | A1 | 1/2004 | Ansari et al. |
| 2004/0030750 | A1 | 2/2004 | Moore et al. |
| 2004/0031058 | A1 | 2/2004 | Reisman |
| 2004/0031856 | A1 | 2/2004 | Atsmon et al. |
| 2004/0034877 | A1 | 2/2004 | Nogues |
| 2004/0049728 | A1 | 3/2004 | Langford |
| 2004/0064351 | A1 | 4/2004 | Mikurak |
| 2004/0068740 | A1 | 4/2004 | Fukuda et al. |
| 2004/0068753 | A1 | 4/2004 | Robertson et al. |
| 2004/0070491 | A1 | 4/2004 | Huang et al. |
| 2004/0073918 | A1 | 4/2004 | Ferman et al. |
| 2004/0098571 | A1 | 5/2004 | Falcon |
| 2004/0107125 | A1 | 6/2004 | Guheen et al. |
| 2004/0107439 | A1 | 6/2004 | Hassell et al. |
| 2004/0111745 | A1 | 6/2004 | Schein et al. |
| 2004/0111756 | A1 | 6/2004 | Stuckman et al. |
| 2004/0117813 | A1 | 6/2004 | Karaoguz et al. |
| 2004/0117824 | A1 | 6/2004 | Karaoguz et al. |
| 2004/0128342 | A1 | 7/2004 | Maes et al. |
| 2004/0139173 | A1 | 7/2004 | Karaoguz et al. |
| 2004/0143600 | A1 | 7/2004 | Musgrove et al. |
| 2004/0143652 | A1 | 7/2004 | Grannan et al. |
| 2004/0148408 | A1 | 7/2004 | Nadarajah |
| 2004/0150676 | A1 | 8/2004 | Gottfurcht et al. |
| 2004/0183839 | A1 | 9/2004 | Gottfurcht et al. |
| 2004/0194136 | A1 | 9/2004 | Finseth et al. |
| 2004/0198386 | A1 | 10/2004 | Dupray |
| 2004/0201600 | A1 | 10/2004 | Kakivaya et al. |
| 2004/0210633 | A1 | 10/2004 | Brown et al. |
| 2004/0210935 | A1 | 10/2004 | Schein et al. |
| 2004/0213271 | A1 | 10/2004 | Lovy et al. |
| 2004/0221302 | A1 | 11/2004 | Ansari et al. |
| 2004/0223485 | A1 | 11/2004 | Arellano et al. |
| 2004/0226035 | A1 | 11/2004 | Hauser, Jr. |
| 2004/0226045 | A1 | 11/2004 | Nadarajah |
| 2004/0239624 | A1 | 12/2004 | Ramian |
| 2004/0252119 | A1 | 12/2004 | Hunleth et al. |
| 2004/0252120 | A1 | 12/2004 | Hunleth et al. |
| 2004/0252769 | A1 | 12/2004 | Costa et al. |
| 2004/0252770 | A1 | 12/2004 | Costa et al. |
| 2004/0260407 | A1 | 12/2004 | Wimsatt |
| 2004/0261116 | A1 | 12/2004 | McKeown et al. |
| 2004/0267729 | A1 | 12/2004 | Swaminathan et al. |
| 2004/0268393 | A1 | 12/2004 | Hunleth et al. |
| 2005/0027851 | A1 | 2/2005 | McKeown et al. |
| 2005/0038814 | A1 | 2/2005 | Iyengar et al. |

| | | | |
|---|---|---|---|
| 2005/0044280 | A1 | 2/2005 | Reisman |
| 2005/0097612 | A1 | 5/2005 | Pearson et al. |
| 2005/0132295 | A1 | 6/2005 | Noll et al. |
| 2005/0149988 | A1 | 7/2005 | Grannan |
| 2005/0168372 | A1 | 8/2005 | Hollemans |
| 2005/0195961 | A1 | 9/2005 | Pasquale et al. |
| 2006/0026663 | A1 | 2/2006 | Kortum |
| 2006/0037043 | A1 | 2/2006 | Kortum |
| 2006/0037083 | A1 | 2/2006 | Kortum |
| 2006/0048178 | A1 | 3/2006 | Kortum |
| 2006/0077921 | A1 | 4/2006 | Radpour |
| 2006/0114360 | A1 | 6/2006 | Kortum |
| 2006/0117374 | A1 | 6/2006 | Kortum |
| 2006/0156372 | A1 | 7/2006 | Cansler, Jr. |
| 2006/0161953 | A1 | 7/2006 | Walter |
| 2006/0168610 | A1 | 7/2006 | Williams |
| 2006/0174279 | A1 | 8/2006 | Sullivan |
| 2006/0174309 | A1 | 8/2006 | Pearson |
| 2006/0179466 | A1 | 8/2006 | Pearson |
| 2006/0179468 | A1 | 8/2006 | Pearson |
| 2006/0184991 | A1 | 8/2006 | Schlamp |
| 2006/0184992 | A1 | 8/2006 | Kortum |
| 2006/0190402 | A1 | 8/2006 | Patron |
| 2006/0218590 | A1 | 9/2006 | White |
| 2006/0230421 | A1 | 10/2006 | Pierce |
| 2006/0236343 | A1 | 10/2006 | Chang |
| 2006/0268917 | A1 | 11/2006 | Nadarajah |
| 2006/0282785 | A1 | 12/2006 | McCarthy et al. |
| 2006/0290814 | A1 | 12/2006 | Walter |
| 2006/0294559 | A1 | 12/2006 | Ansari |
| 2006/0294561 | A1 | 12/2006 | Grannan |
| 2006/0294568 | A1 | 12/2006 | Walter |
| 2007/0011133 | A1 | 1/2007 | Chang |
| 2007/0011250 | A1 | 1/2007 | Kortum |
| 2007/0021211 | A1 | 1/2007 | Walter |
| 2007/0025449 | A1 | 2/2007 | Van Vleck |

FOREIGN PATENT DOCUMENTS

| | | | |
|---|---|---|---|
| WO | 00/28689 | A2 | 5/2000 |
| WO | 01/60066 | A1 | 8/2001 |
| WO | 02/17627 | A2 | 2/2002 |
| WO | 02/058382 | A1 | 7/2002 |
| WO | 03/003710 | A2 | 1/2003 |
| WO | 03/025726 | A1 | 3/2003 |
| WO | 2004/018060 | A2 | 3/2004 |
| WO | 2004/032514 | A1 | 4/2004 |
| WO | 2004/062279 | A1 | 7/2004 |
| WO | 2005/045554 | A2 | 5/2005 |

OTHER PUBLICATIONS

Kapinos, Stan, "Accenda Universal Remote Control Targets Needs of Elderly, Visually Impaired, Physically Challenged . . . And the Rest of Us," Innotech Systems, Inc., Press Release, Port Jefferson, NY, Dec. 15, 2002, 4 pages.

SYSTEM AND METHOD OF USING A REMOTE CONTROL AND APPARATUS

RELATED APPLICATIONS

The present application is a continuation of and claims priority to U.S. patent application Ser. No. 11/049,629, filed Feb. 2, 2005, the contents of which are incorporated by reference in their entirety.

BACKGROUND

1. Field of the Disclosure

The present disclosure relates to remote controls, apparatuses, and systems, and methods of using the same, and more particularly to remote controls, apparatuses, and systems, any one or more of which can produce a non-visible signal to identify a control before activating a function associated with the control.

2. Description of the Related Art

Remote controls can provide audible signals, whether in the form of words or tones, to notify a user after a key has been depressed. An example of a remote control with such a function is a remote control made by Accenda of Port Washington, N.Y. The Accenda remote control is designed for use with a TV, VCR, cable box, or satellite.

Similar to many other remote controls, the Accenda remote control announces the key after the key has been depressed and the function associated with the key has been activated. Announcing a key after a function has been activated can be undesired. For example, a VCR tape may be over ten years old and include images of a deceased friend or relative. If the key for the record function was pressed instead of the key for the play function, the valuable VCR tape may be recorded over with undesired content. The user may need to quickly find the stop key to prevent further recording. If the user is blind, visually impaired, or has normal vision but is in a dark room, locating the correct key may be difficult. Therefore, providing an "after-the-fact" announcement to notify the user of the function that was activated may provide feedback too late to the user. Accordingly, there is a need for an improved remote control and method of using a remote control.

Figure 1:
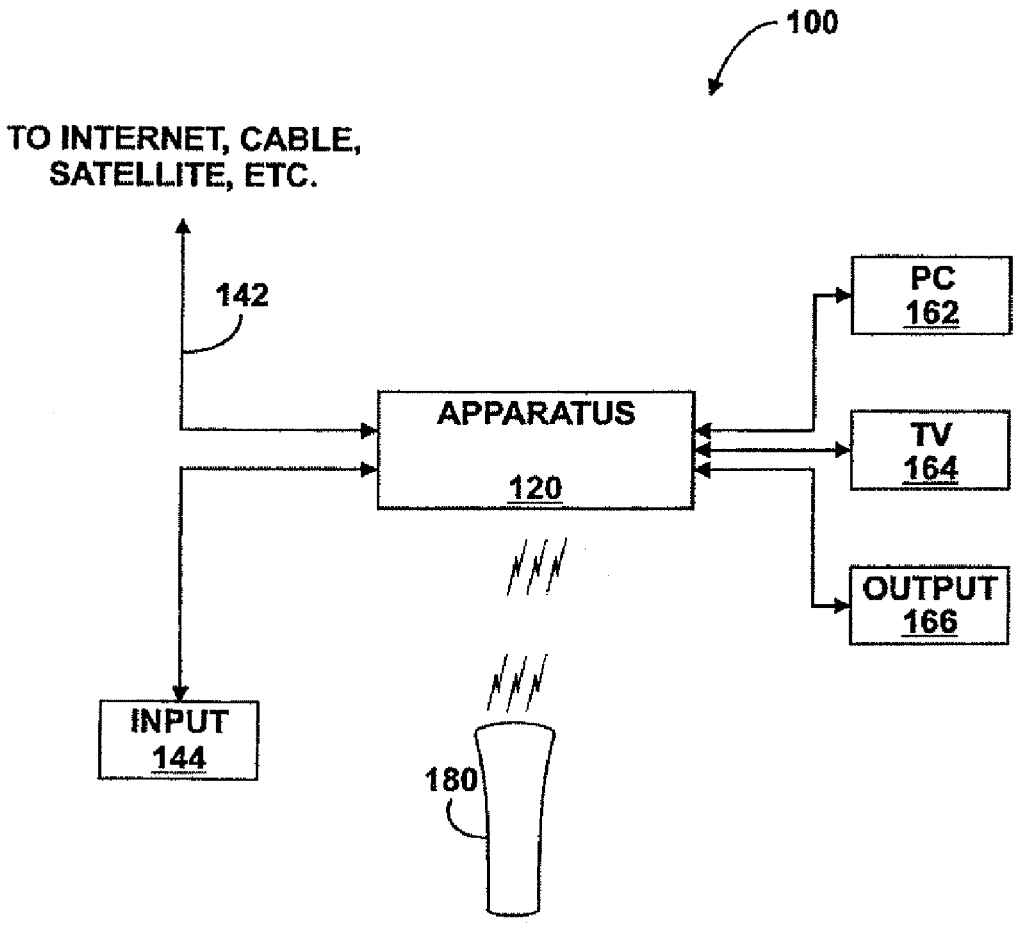
FIG. 1 includes a block diagram of a home entertainment system.

Skilled artisans appreciate that elements in the figures are illustrated for simplicity and clarity and have not necessarily been drawn to scale.

DETAILED DESCRIPTION

A system provides a non-visible signal to the user of the system before a control or function is activated by the user. In this manner, the user can be visually impaired, in a dark environment, or in a position where visual confirmation of a control may be undesired. In one embodiment, a remote control can be used with an apparatus, such as a set-top box. When the user places an object near a control within the remote control, a control or function associated with the control may be announced to the user before he or she decides to activate the control. In another embodiment, equipment, such as an automobile, can be the system. Similar to the remote control, when the user places an object near a control within the remote control, a control or function associated with the control may be announced to the user before he or she decides to activate the control. The likelihood of activating the wrong control is substantially reduced or eliminated. Also, the likelihood of causing irreversible damage (unintentionally recording over existing content) can also be substantially reduced.

In one aspect, a method of using a remote control controls an operation of an apparatus. The remote control includes a plurality of controls including a first control that corresponds to a first function. The method includes sensing that a first object is near the first control before the first function is activated. In response to sensing, the method also includes providing a first audible signal that corresponds to a first identifier of the first control. The method further includes sending a first activation signal to the apparatus to identify activation of the first control.

In one embodiment, the method farther comprises sensing a first force of at least a first activation threshold at the first control, or allowing a predetermined amount of time to pass before sensing a second force of at least a second activation threshold at any control within the plurality of controls other than the first control.

In another embodiment, the method farther includes sensing that a second object is near a second control before a second function is activated, wherein the plurality of controls includes the second control that corresponds to the second function, and the second object is the same or different from the first object. In response to sensing that the second object is near the second control, the method also includes providing a second audible signal that corresponds to a second identifier for the second control. Sensing the second object is near the second control and providing the second audible signal are performed before sensing the first object is near the first control and providing the first audible signal. The second function is not activated during a time period between providing the second audible signal and sensing the first object is near the first control.

In still another embodiment, the method further includes receiving a language selection signal associated with the first audio signal. In yet another embodiment, the method further includes receiving a user-defined signal associated with the first audio signal.

In another aspect, a remote control controls an operation of an apparatus. The remote control includes a plurality of controls including a first control that corresponds to a first function and a control module. The control module is configured to receive a first sensing signal when a first object is near the first control before the first function is activated, in response to receiving the first sensing signal, provide a first audio signal that corresponds to a first identifier of the first control, and send a first activation signal to the apparatus to identify activation of the first control in response to a predetermined activity.

In one embodiment, the predetermined activity includes sensing a first force of at least a first activation threshold at the first control. Alternatively, the predetermined activity includes allowing a predetermined amount of time to pass before sensing a second force of at least a second activation threshold at any control within the plurality of controls other than the first control.

In another embodiment, the plurality of controls includes a second control that corresponds to a second function. The control module is further configured to not provide an audio signal that corresponds to a second identifier associated with the second control, and send a second activation signal to the apparatus to identify activation of the second control after the second control receives a force of at least the activation threshold.

In still another embodiment, the plurality of controls includes a second control that corresponds to a second function, wherein the second control is different from the first control. The control module is further configured to receive a second sensing signal when a second object is near the second control before the second function is activated, wherein the second object is the same or different compared to the first object, and in response to receiving the second sensing signal, provide a second audio signal that corresponds to a second identifier of the second control.

In a further embodiment, the remote control further includes a sensing module responsive to the first control and coupled to the control module and a transmitter responsive to the control module. In a particular embodiment, the remote control further includes an audio module responsive to the control module and a speaker responsive to the audio module.

In still another aspect, a method can be used to operate a system including an apparatus and a remote control that controls an operation of the apparatus. The remote control includes a plurality of controls including a first control, wherein the first control corresponds to a plurality of functions including a first function. The method includes sensing that a first object is near the first control during a first time period, wherein sensing is performed by the remote control. The method also includes determining a first state of the apparatus, wherein the apparatus is capable of being in at least one state of a plurality of states including the first state. The method further includes determining a first function corresponds to the first control, based at least in part on the first state of the apparatus. The method still further includes providing a first audio signal, wherein the first audio signal corresponds to a first identifier of the first function.

In one embodiment, determining the first state of the apparatus includes determining which one or more input devices coupled to the apparatus is active, determining which one or more output devices coupled to the apparatus is active, or any combination thereof. In a particular embodiment, the method farther includes sensing a second object is near the first control during a second time period, wherein sensing is performed by the remote control. The method still further includes determining a second state of the apparatus during the second time period, wherein the plurality of states includes the second state that is different from the first state. The method yet further includes determining a second function corresponds to the first control, based at least in part on the second state of the apparatus, wherein the second function is different from the first function. The method also includes providing a second audio signal, wherein the second audio signal corresponds to a second identifier of the second function.

In another embodiment, the method further includes activating the first control in response to a predetermined activity. Providing the second audio signal is performed before activating the first control. The predetermined activity includes sensing a first force of at least a first activation threshold at the first control. Alternatively, the predetermined activity includes allowing a predetermined amount of time to pass before sensing a second force of at least a second activation threshold at any control within the plurality of controls other than the first control.

In a particular embodiment, the method further includes sensing a second object is near a second control during the first time period, wherein the plurality of controls includes the second control that is different from the first control. The method also includes determining a second function corresponds to the second control, based at least in part on the first state of the apparatus, wherein the plurality of functions includes the second function that is different from the first function. The method further includes providing a second audio signal that corresponds to a second identifier of the second function. Sensing the second object is near the second control and providing the second audio signal are performed before sensing the first object is near the first control and providing the first audio signal. The second function is not activated during a time period between providing the second audio signal and sensing the first object is near the first control.

In a further aspect, a remote control includes a plurality of controls including a first control, wherein the first control corresponds to a plurality of functions including a first function and a control module. The control module is configured to receive a first sensing signal when a first object is near the first control during a first time period, in response to receiving the first sensing signal, provide a first identification signal to a remote apparatus, wherein the first identification signal corresponds to the first control, receive a second identification signal from the remote apparatus, wherein the second identification information signal corresponds to the first function, and provide a first audio signal, wherein the first audio signal corresponds to a first identifier of the first function.

In one embodiment, wherein the control module is further configured to receive another first sensing signal when a second object is near the first control during a second time period, wherein the second object is the same or different from the first object. In response to receiving the other first sensing signal, the control module is further configured to provide the first identification signal to the apparatus, wherein the first identification signal corresponds to the first control. The control module is still further configured to receive a third identification signal from the apparatus, wherein the third identification signal corresponds to a second function, and wherein the plurality of functions includes the second function that is different from the first function. The control module is further configured to provide a second audio signal different from the first audio signal, wherein the second audio signal corresponds to a second identifier of the second function.

In another embodiment, the control module is further configured to send a first activation signal to the apparatus in response to a predetermined activity. The predetermined activity includes sensing a first force of at least a first activation threshold at the first control. Alternatively, the predetermined activity includes allowing a predetermined amount of time to pass before sensing a second force of at least a second activation threshold at any control within the plurality of controls other than the first control.

In a still another embodiment, the remote control further includes an audio module responsive to the control module and a speaker responsive to the audio module.

In yet a further aspect, an apparatus is configured to be operated at least in part from a remote control that includes a plurality of controls including a first control. The apparatus includes a control module configured to receive a first identification signal from the remote control, wherein the first identification signal corresponds to the first control, determine a state of the apparatus, wherein the apparatus is capable of being in at least one state of a plurality of states, determine a function to which the first control corresponds, based at least in part on the state of the apparatus, and send a second identification signal to an audio system, wherein the second identification signal corresponds to the first function.

In one embodiment, the control module is configured to determine the first state of the apparatus by determining which one or more input devices coupled to the apparatus is active, determining which one or more output devices coupled to the apparatus is active, or any combination thereof.

In another embodiment, the audio system lies within the remote control. In still another embodiment, the audio system lies outside of the remote control.

In a further embodiment, the control module is further configured to receive a first activation signal from the remote control to identify activation of the first control and send a signal to activate the first function.

In yet a further embodiment, the apparatus further includes an I/O module coupled to the control module and a transceiver coupled to the control module. In a particular embodiment, the apparatus further includes a hard drive coupled to the control module.

In another aspect, a method is used for a system that includes a plurality of controls including a first control. The method includes sensing a first object is near the first control before a first function associated with the first control is activated, in response to sensing, providing a first audible signal, wherein the first audible signal corresponds to a first identifier of the first control or the first function, and sending a first activation signal to identify activation of the first control.

In one embodiment, the method further includes sensing a second object is near a second control that corresponds to a second function before the second function is activated, wherein the plurality of controls includes the second control that is different from the first control. In response to sensing, the method also includes providing a second audible signal that corresponds to a second identifier of the second control. Sensing the second object is near the second control and providing the second audible signal are performed before sensing the first object is near the first control and providing the first audible signal. The second function is not activated during a time period between providing the second audible signal and sensing the first object is near the first control.

In yet another aspect, a system includes a plurality of controls including a first control and a control module. The control module is configured to receive a first sensing signal when a first object is near the first control before a first function associated with the first control is activated. In response to receiving the first sensing signal, the control module is still further configured to provide a first audio signal, wherein the first audio signal corresponds to an identifier for the first control or the first function. The control module is yet further configured to send a first activation signal to identify activation of the first control in response to a predetermined activity.

In one embodiment, the predetermined activity includes sensing a first force of at least a first activation threshold at the first control. Alternatively, the predetermined activity includes allowing a predetermined amount of time to pass before sensing a second force of at least a second activation threshold at any control within the plurality of controls other than the first control.

In another embodiment, the plurality of controls includes a second control that corresponds to a second function. In still another embodiment, the plurality of controls includes a second control that corresponds to a second function, wherein the second control is different from the first control. The control module is further configured to receive a second sensing signal when a second object is near the second control before the second function is activated, and in response to receiving the second sensing signal, provide a second audio signal that corresponds to a second identifier of the second control.

Before addressing details of embodiments described below, some terms are defined or clarified. The term "audible signal" refers to a signal that can be hear and understood by a human. The term "audio signal" refers to a signal corresponding to one or more audible signals that can be transferred between or processed by a machine. Audible signal and audio signal are similar to an analogy between source code and object code for software programs.

The term "control" refers to a button, level, key, switch or nearly any other physical item that is capable of activating a function. The term control is to be construed broadly.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, for clarity purposes and to give a general sense of the scope of the embodiments described herein, the use of the "a" or "an" are employed to describe one or more articles to which "a" or "an" refers. Therefore, the description should be read to include one or at least one whenever "a" or "an" is used, and the singular also includes the plural unless it is clear that the contrary is meant otherwise.

Unless stated otherwise, any combination of parts of a system may be bi-directionally or uni-directionally coupled to each other, even though a figure may illustrate only a single-headed arrow or a double-headed arrow. Arrows within the drawing are illustrated, as a matter of convenience, to show a principal information, data, or signal flow within the system or between the system and one or more component outside the system, one or more module outside the system, one or more module outside the system, another system, or any combination thereof in accordance with an embodiment. Coupling should be construed to include a direct electrical connection in one embodiment and alternatively, may include any one or more of an intervening switch, resistor, capacitor, inductor, router, firewall, network fabric or the like between any combination of one or more component, one or more devices, or one or more modules.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety. In case of conflict, the present specification, including definitions, will control. In addition, the materials, methods, and examples are illustrative only and not intended to be limiting.

To the extent not described herein, many details regarding specific network, hardware, software, and firmware components and acts are conventional and may be found in textbooks and other sources within any one or more of the multimedia, information technology, networking and telecommunications arts.

FIG. 1 includes a block diagram of a system 100. The system 100 can be centrally controlled by an apparatus 120. The apparatus 120 may receive input from any one or more sources including a subscriber line 142, which may be connected to the an internet service provider, a cable service provider, a satellite dish, a telephone line, another conventional type of subscriber line (wired or wireless), or any combination thereof. The apparatus 120 may also be connected to an input device 144. An example of the input device 144 can include a video cassette recorder ("VCR"), a digital video disk ("DVD") player, an audio compact disc ("CD") player, another conventional device that may be used in conjunction with a home entertainment system, or any combination thereof. The apparatus 120 may provide output to a personal computer ("PC") 162, a television ("TV") 164, or other output device 166. An example of the output device 166 can include a VCR, a DVD player, a CD burner, speakers, another conventional output device used with a home entertainment system, or any combination thereof. In one embodiment, each of the subscriber line 142, input device 144, personal computer 162, television 164, and output device 166 are bi-directionally coupled to the apparatus 120. In another embodiment, the subscriber line 142, input device 144, personal computer 162, television 164, output device 166, or any combination thereof may be directly connected to the apparatus 120, or may be uni-directionally coupled or connected to the apparatus 120 (allows signals to flow in only one direction).

The apparatus 120 can be controlled by a remote control 180. The remote control 180 can communicate with the apparatus 120 using electronic signals, radio-frequency signals, optical signals, signals using other electromagnetic radiation, or any combination thereof. In one embodiment, the remote control 180 does not need to contact or otherwise be tethered to the apparatus 120. In another embodiment (not illustrated), the remote control 180 can be coupled to the apparatus 120 using one or more one wires.

Figure 2:
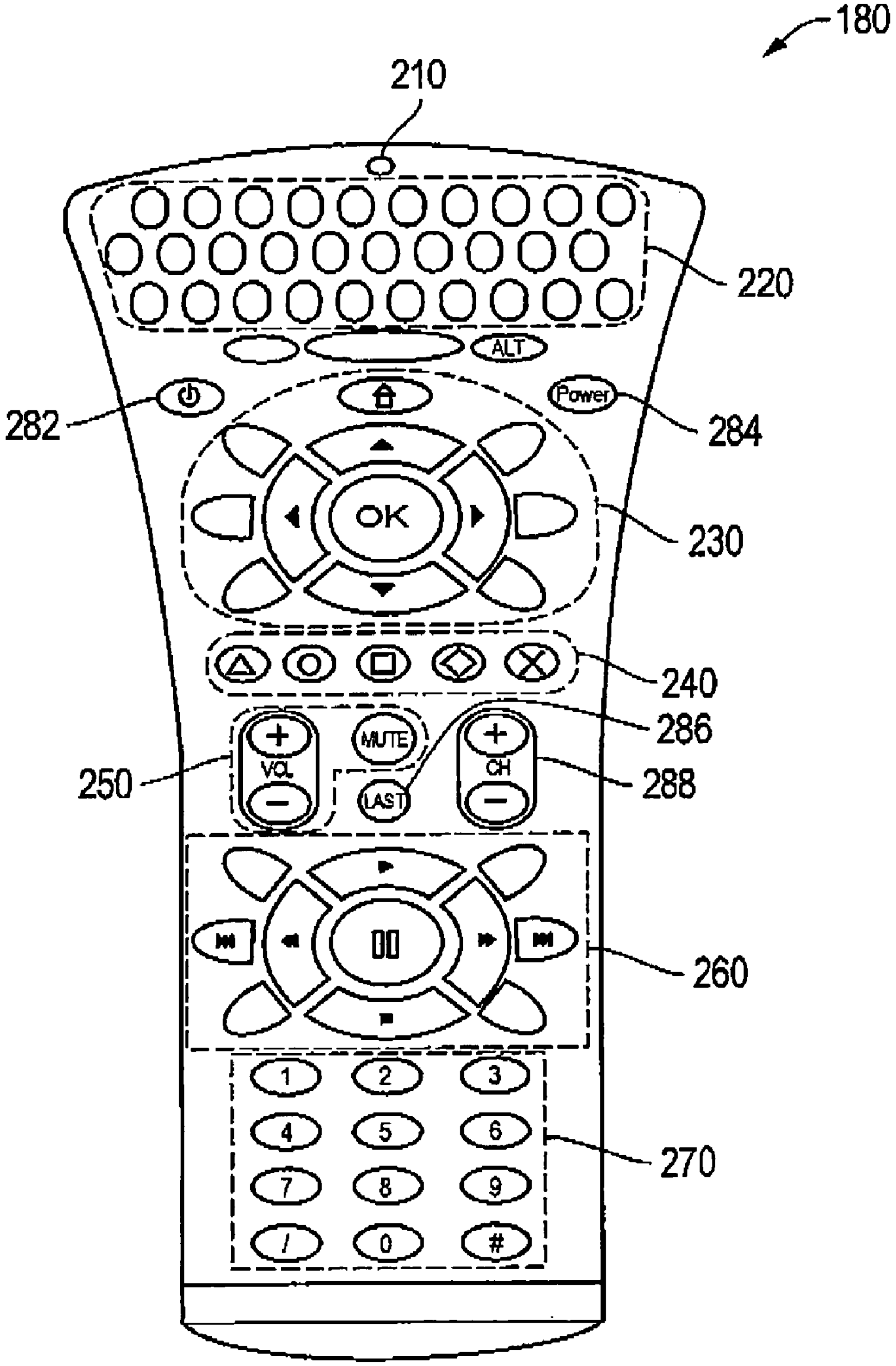
FIG. 2 includes an illustration of a control layout for a remote control that can be used with the home entertainment system of FIG. 1.

FIG. 2 includes an illustration of the remote control 180 that includes a plurality of controls that by themselves or in conjunction with one another can be used to activate a function of the apparatus 120. The controls include buttons and keys in one embodiment. The remote control 180 includes an activation indicator 210 that indicates when a control in the remote control 180 has been activated. The remote control 180 and includes a plurality of different sections including a QWERTY keyboard section 220, Internet navigation section 230, a special features section 240, a volume control section 250, media control section 260, and a number pad section 270. The remote control 180 also includes an apparatus power control 282, a TV power control 284, a "last" button 286 which allows the user to go to the immediately prior channel that the user was viewing, and channel controls 288. The special features section 240 includes controls for play, summary, move, show/hide adult, content, delete, or the like. In other embodiments, more, fewer, or other controls may be part of the special features section.

Figure 3:
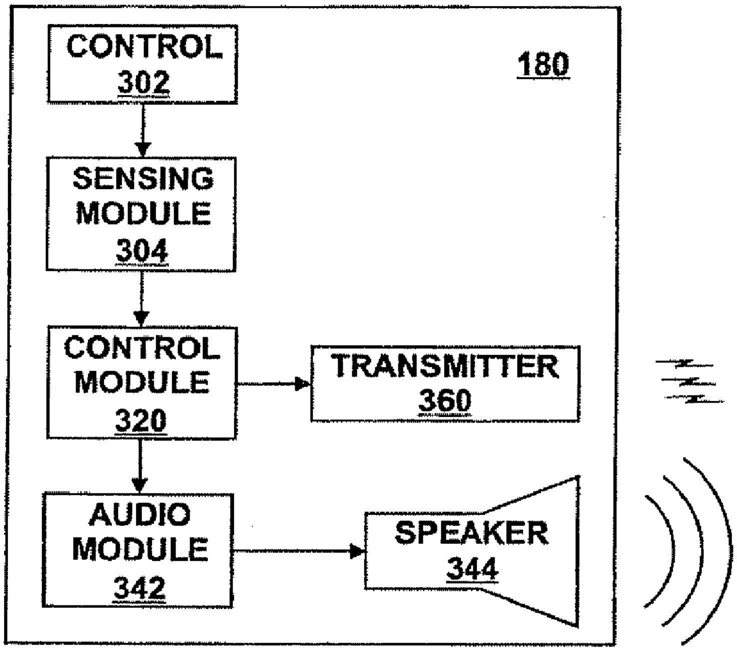
FIGS. 3 and 4 include block diagrams that illustrate embodiments of the remote control of FIG. 2.
Figure 4:
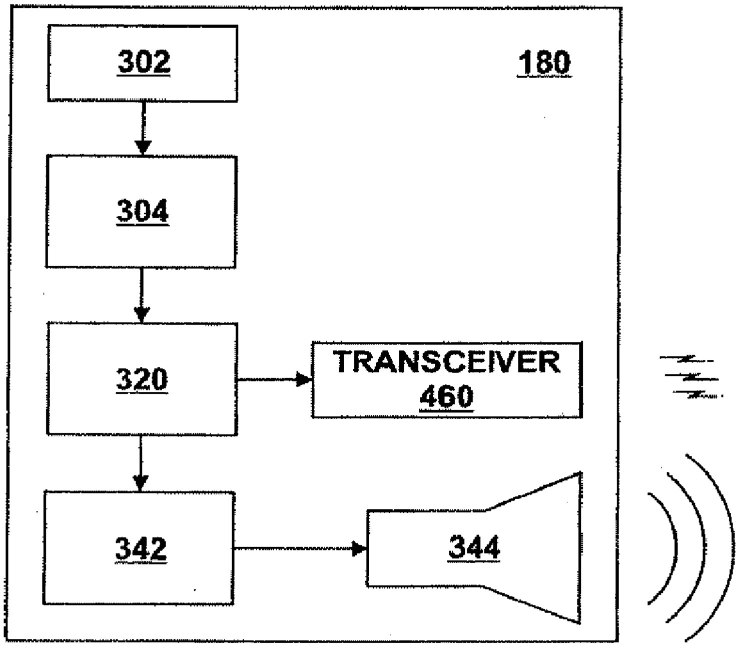

FIGS. 3 and 4 include block diagrams to better illustrate some of the components and modules that provide functionality within the remote control 180. Referring to FIG. 3, the remote control 180 includes a control 302 that is coupled to a sensing module 304. The control 302 may be any of the keys or buttons previously described with respect to the remote control 180. The sensing module 304 is coupled to a control module 320. The control module 320 is coupled to an audio module 342 that is coupled to a speaker 344. The combination of the audio module 342 and the speaker 344 is an example of an audio system. The speaker 344 allows audible signals, such as tones, words, music, or other sounds to be heard by a user of the system 100, and more particularly the user of the remote control 180. The control module 320 is also coupled to a transmitter 360 that can send signals to the apparatus 120.

Referring to FIG. 4, the illustrative embodiment of remote control 180 is substantially the same as the one illustrated in FIG. 3, except that a transceiver 460 is used instead of the transmitter 360. The transceiver 460 can allow bi-directional communication between the apparatus 120 and the remote control 180. More or fewer modules and other components than illustrated may be used in other embodiments. For example the audio system, which includes the audio module 342 and the speaker 344, is not required to be within the remote control 180. In an alternate embodiment, an audio system can be part of or coupled to the apparatus 120. Although not illustrated, the remote control 180 may include one or more memory devices that can be used to store tones, words, or other sounds in the form of audio signals that can be converted to audible signals.

Figure 5:
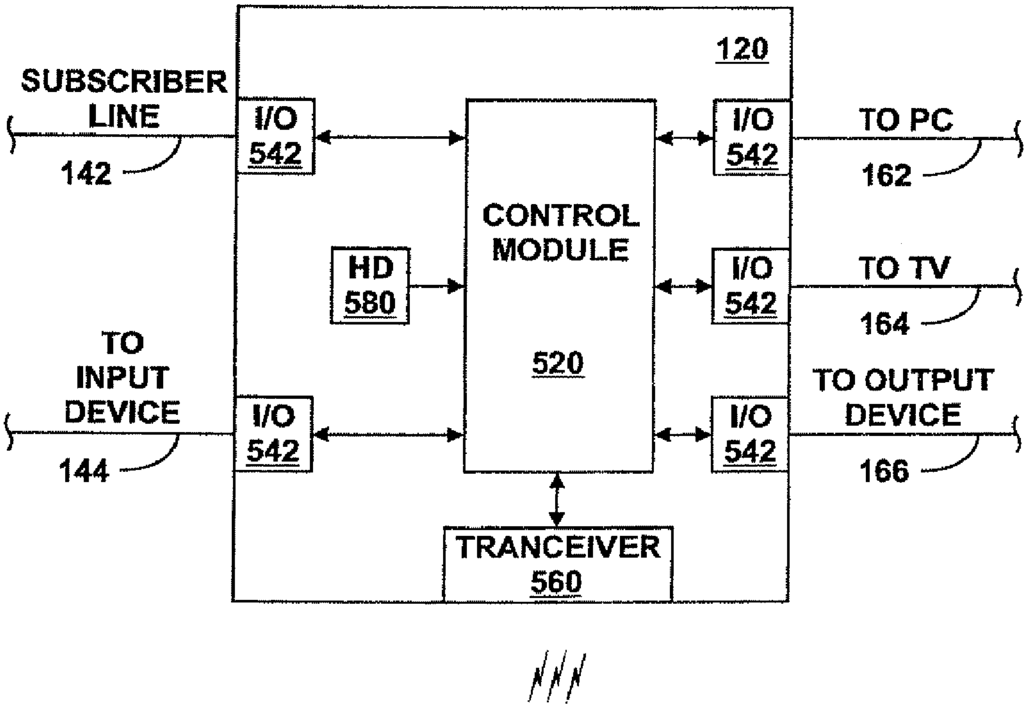
FIG. 5 includes a block diagram of an apparatus that can be used with the home entertainment system of FIG. 1.

FIG. 5 includes a block diagram to better illustrate some of the components and modules that provide functionality within the apparatus 120. In one embodiment, the apparatus 120 is a set-top box that can be connected to one or more input devices, one or more output devices, or any combination thereof. The apparatus 120 includes a control module 520 that controls a wide array of functions within the apparatus 120. In one embodiment, the control module can include a microcontroller, a microprocessor, a chipset, a motherboard, or a collection of different modules that provide the functionality described in this specification. The control module 520 is bi-directionally coupled to I/O modules 542. The I/O modules 542 are coupled to a subscriber line 142, the input device 144, the PC 162, the TV 164, and the output device 166 as illustrated. In another embodiment, more or fewer input devices, more or fewer output devices, or a combination thereof, may be used with the apparatus 120. The control module 520 is also bi-directionally coupled to a transceiver 560. Transceiver 560 is capable of receiving signals from and sending signals to the remote control 180. In still another embodiment, the transceiver 560 can be replaced by a receiver (not illustrated) that receives signals from the remote control 180 and is coupled to the control module 520. A hard disk ("HD") 580 is coupled to the control module 520. Stored content, such as movies, broadcast programs, pictures, audio files, or any combination thereof may be stored in HD 580. HD 580 can also include one or more software programs for operating part or all of the system 100, and the apparatus 120 in particular.

Although not illustrated, the apparatus 120 can also include an audio system similar to the audio system described with respect to the remote control 180. The audio module could be coupled to the control module 520, and the speaker would be coupled to that audio module. In another embodiment, the audio system may be part of an output device, such as the PC 162, the TV 164, or the output device 166. Therefore the audio system may lie within the remote control 180, within the apparatus 120, or lie outside the remote control 180 and the apparatus 120.

The control module 320, the control module 520, or both may include a central processing unit ("CPU") or controller. Each of the apparatus 120 and the remote control 180 is an example of a data processing system. Although not shown, other connections and memories (not shown) may reside in or be coupled to any of the control module 320, the control module 520, or any combination thereof. Such memories can include content addressable memory, static random access memory, cache, first-in-first-out ("FIFO"), other memories, or any combination thereof. The memories, including. HD 580, can include media that can be read by a controller, CPU, or both.

Portions of the methods described herein may be implemented in suitable software code for carrying out the disclosed methods. In one embodiment, the computer-executable instructions may be lines of assembly code or compiled $C^{++}$, Java, or other language code. In another embodiment, the code may be contained on a data storage device, such as a hard disk, magnetic tape, floppy diskette, optical storage device, networked storage device(s), or other appropriate data processing system readable medium or storage device.

The functions of the remote control 180 may be performed at least in part by the apparatus 120 or by a computer. Additionally, a software program or its software components with such code may be embodied in more than one data processing system readable medium in more than one computer or other item having a CPU.

Attention is now directed to methods of using the system 100 in accordance with some illustrative, but not limiting, embodiments. A couple of embodiments of methods are illustrated in the process flow diagrams of FIGS. 6 and 7.

Figure 6:
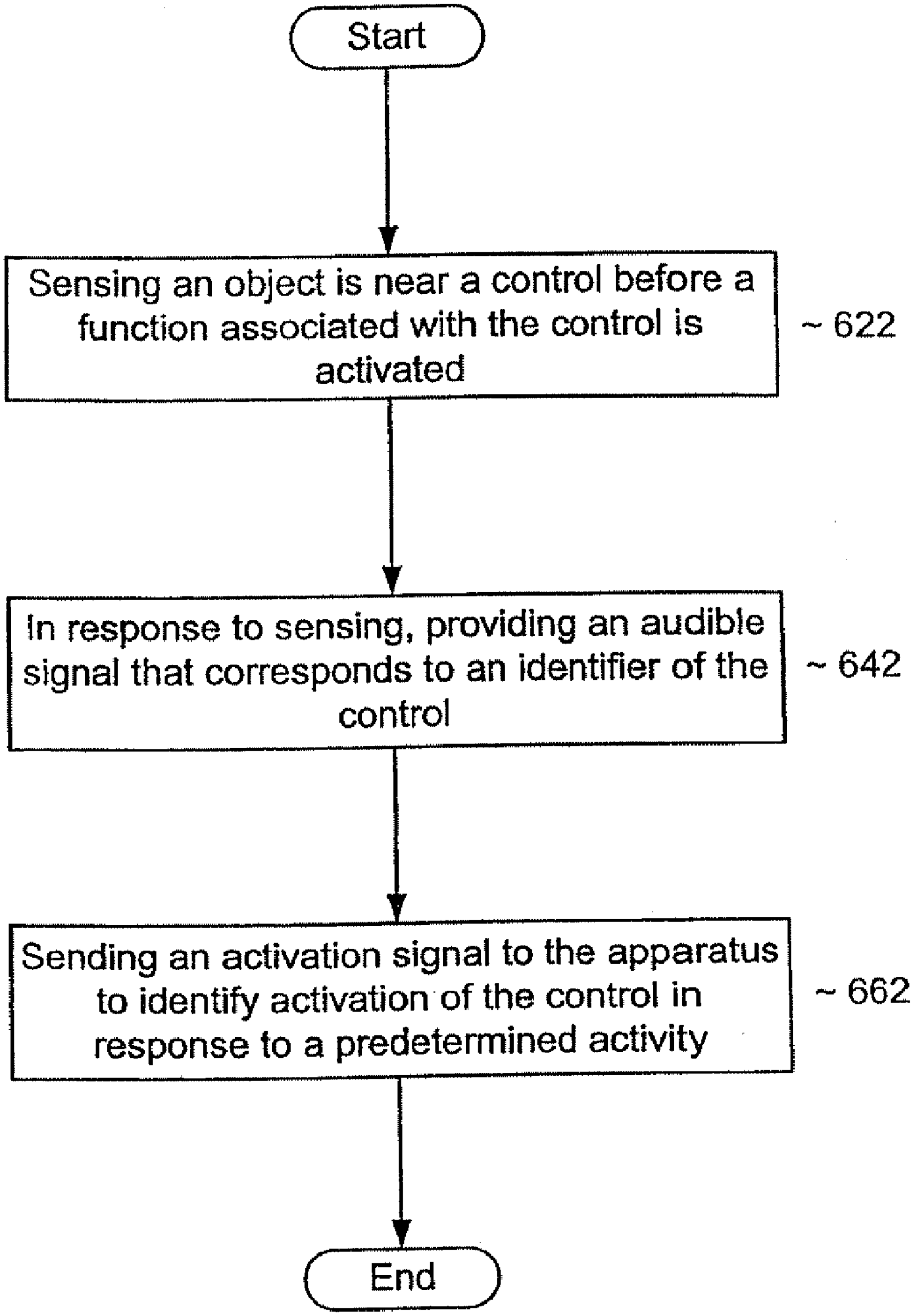
FIGS. 6 and 7 include flow diagrams of methods of using the system of FIG. 1.

The method illustrated in FIG. 6 can be performed with the remote control 180 having modules as illustrated in FIG. 3 or 4. In one embodiment, the remote control 180 can be used to provide an audible signal to a user regarding any one or more of the controls of the remote control 180 before the control is activated. The method can include sensing an object that is near a control before a function associated with the control is activated (block 622). As used in this specification, near is to be construed to cover when the object is close to but not in contact with the control 302, or when the object contacts but does not activate, the control 302. The object can include a finger, a stylus, a pen, a pencil, or nearly anything else that can be used to press or otherwise activate the control 302 of the remote control 180.

Sensing may occur in any one or more of several different ways. In one embodiment, proximity sensing can be used. When proximity sensing is used, sensing may be detected by the sensing module 304 using electronic or optical signals within a circuit. For example, light from a light source near the control 302 may be reflected by the object as it moves near the control 302. The light is reflected into a detector within the remote control 180. The detector may be part of the sensing module 304. In another embodiment, another form of radiation may be used instead of light. In still another embodiment, sensing may occur as a change in resistance or capacitance within a circuit when the object is near or contacts the control 302. In still another embodiment, other conventional proximity detection schemes may be used.

In a particular embodiment, the object may contact but does not activate the control 302. More specifically, a force may be applied to the control 302. In a particular embodiment, the force used for sensing would be no greater than an activation threshold force that may be used to activate the control 302. For example, if 0.2 Newton (N) (approximately 1 pound) is the activation threshold force used to activate the control 302, the force applied to the control 302 should be less than the activation threshold force, for example 0.1 N (approximately ½ pound). In another particular embodiment, the force used for sensing may exceed a minimum force (i.e. a sensing threshold force), for example 0.02 N (approximately 0.1 pound) to account for incidental contact. For example, when the remote control 180 is resting on a chair with the controls facing the chair (e.g., the control 302 contacts the chair), the control 302 would not be detected as being sensed. Skilled artisans will appreciate that other numbers or ranges of forces may be used.

In another embodiment, a timer circuit (not illustrated) may be used in conjunction with or as part of the sensing module 304. In this embodiment, the force used during sensing would be sufficient to exceed a minimum force (e.g., 0.02 N), such that incidental contact of any one or more of the controls in the remote control 180 would not be sensed by the sensing module 304. More details regarding the timer will be discussed with respect to sending an activation signal.

In response to sensing, the method also includes providing an audible signal that corresponds to a first identifier of the first control (block 642). The identifier can be one or more tones, one or more words, music, or other sound that uniquely is associated with the control. For example, the words "set-top box power" may be announced when an object gets near the apparatus power control 282, and the word "zero" may be announced when an object gets near the zero key within the number pad section 270.

In an alternative embodiment, a user of the system 100 or a manufacturer of the remote control 180 or the apparatus 120 may allow a language selection to be made. The language can include English, Spanish, French, German, Japanese, or nearly any other language. In an alternative embodiment, a user may be able to create a user-defined audible signal. In a particular embodiment, the user may record his or her own voice or that of a relative (e.g., a child) that will be played as the audible signal. In another particular embodiment, a user may be able to program the home key within the Internet navigation section 230, such that the audible signal will announce "There's no place like home" when an object gets near the home page key. In still another particular embodiment, the space key within the keyboard section 220 may have a corresponding audible signal that announces "Space, the final frontier."

In yet another embodiment, any one or more controls, any one or more sections of controls, or any combination thereof for the remote control 180 may be configured so that audible signal(s) for one or more controls is not announced. In a particular embodiment, the sensing module 304 may be deactivated for those specific controls or sections, the control module 320 may not send an audio signal to the audible module 342, the audible module 342 may be deactivated for the specific control(s), or any combination thereof. For example, a user may not want to have the controls within the keyboard section 220 announced every time a control within the keyboard section 220 is used. Otherwise, typing a text message may be distracting if the system 200 is also being used for other purposes, such as listening to music or watching a movie. In another example, the controls within the sound control section 250 may not need to be announced because they affect the sound level of the system 200 and may be perceive as the volume of the sound changes. In into another embodiment, one or more functions provided by one or more controls may not cause an irreversible adverse effect. Unlike recording, changing a channel for viewing may not be considered irreversible, and therefore, the identity of the control may not be needed The method can further include sending an activation signal to the apparatus to identify activation of the control in response to a predetermined activity (block 662). The predetermined activity can vary depending on the design of the remote control 180. In one the embodiment, a force greater than an activation threshold force may be used to activate the function associated with control 302. For example, in one particular embodiment, the control 302 may receive a force of 0.3 N, which is greater than the activation threshold force of 0.2 N. When this occurs, the sensing module 304 can generate a signal that is sent to the control module 320. The control module 320 sends an activation signal to the transmitter module 360 (FIG. 3) or transceiver module 460 (FIG. 4), which in turn transmits the activation signal to the apparatus 120. The control module 320 will also send a signal to the activation indicator 210 so that the indicator will become lit. This embodiment allows different levels force to be used with the control 302: a relatively lighter force to be used for sensing, and a relatively heavier force for activation.

In another embodiment, the predetermined activity can be used in conjunction with a timer. In one embodiment, after the control 302 has been pressed one time, the user may need to press the control 302 (i.e., the same control) for a second time within a predetermined time period. The predetermined time period may be nearly any length of time, and may be set in hardware or firmware, or may be adjustable in software. The predetermined time period may start right after the control 302 is pressed for the first time, after the control 302 has been announced (end of audible signal), or nearly any other time. The first time the control 302 is pressed, the identifier for the control 302 may be announced using the audible signal, and the second time the control 302 is pressed within the predetermined time period, the activating signal will be sent from the remote control 180 to the apparatus 120, as previously described. If the control 302 is not pressed for a second time within the time period, the remote control 180 will not generate an activation signal for the control 302. Skilled artisans will appreciate that pressing the same control twice within the predetermined time period is similar to “double clicking” as used with PCs.

In still another embodiment, the control 302 is pressed for a first time, and a function associated with the control 302 is announced (an audible signal) over the speaker 344 of the remote control 180. After a predetermined time period (using a timer), an activation signal associated with the control 302 is sent from the remote control 180 to the apparatus 120, unless the same or another control is pressed within a predetermined time period. If another control is pressed, the timer may be reset and automatically sends an activation signal unless that other key or another key is pressed. When the control 302 is pressed twice within the time period, logic within the control module 320 determines that the activation signal for the control 302 is not to be sent to the apparatus 120.

In another embodiment, the control 302 may correspond to more than one function, depending in part on the state of the apparatus 120. The state of the apparatus 120 may depend on which one or more input devices or one or more output devices within the system 120 are active. For example if the subscriber input line 142 and the TV 164 are active, the apparatus may be in a broadcast mode where signals received over the subscriber line 142 are processed and routed to the TV 164. In another embodiment, the input device 144 may be active. Depending upon the type of input device, one of many different functions may be associated with the control 302. For example, when the input device 144 is an audio CD player, audio signals may be provided to the output device 166, which in one embodiment can be a set of speakers. The control module 520 within the apparatus 120 may be able to determine the state of the apparatus 120.

In still another embodiment, information regarding which devices are active can be sent from the apparatus 120 using the transceiver 560 of the apparatus 120 to the transceiver 460 of the remote control 180. In this embodiment, the control module 320 within the remote control 180 may have logic that can determine the state of the apparatus 120, using at least in part, the information received from the apparatus 120. In this embodiment, signals may be sent and received by each of the remote control 180 and the apparatus 120.

Figure 7:
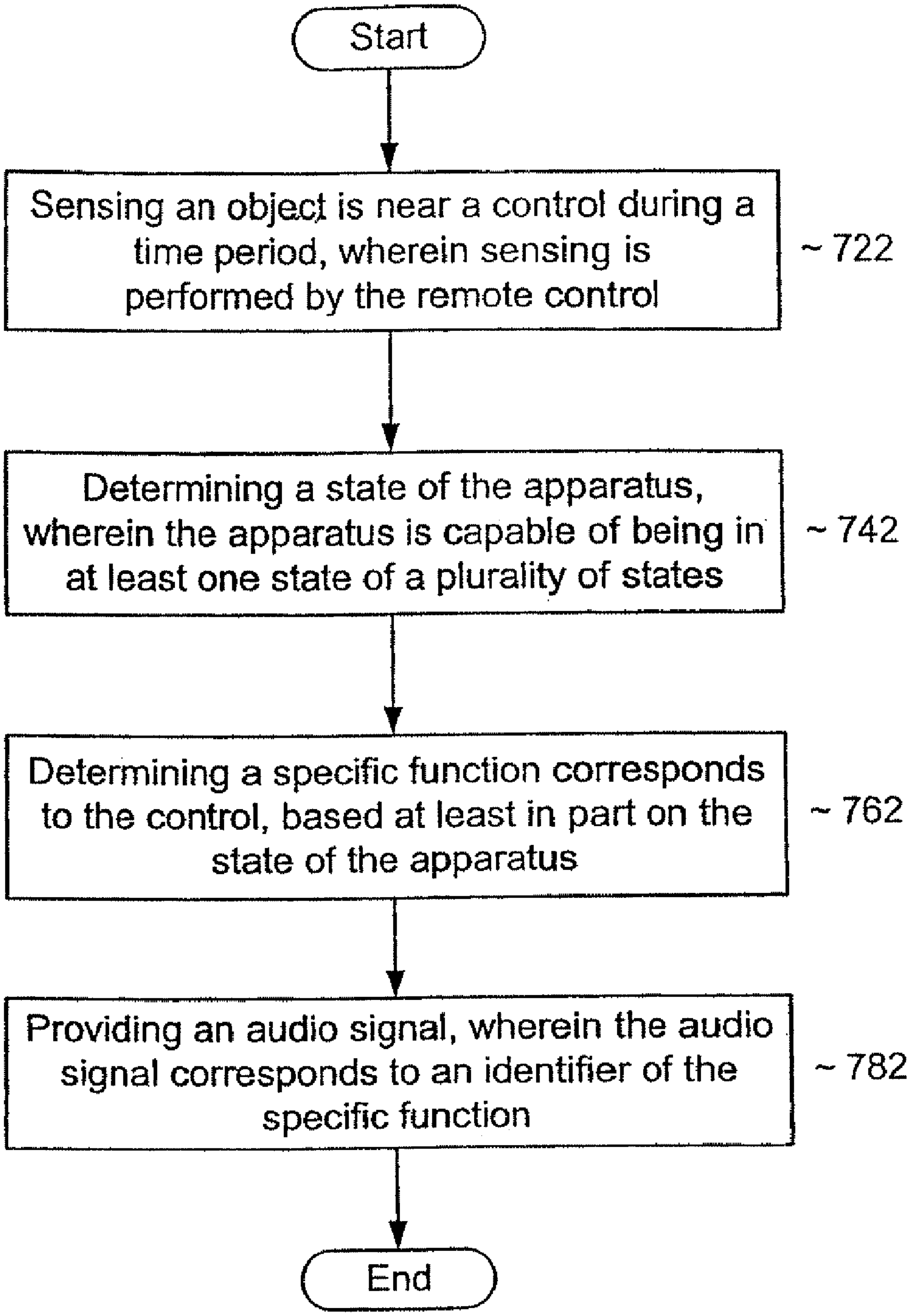

FIG. 7 includes a flow diagram for a method that can be used when there in bi-directional flow of information between the apparatus 120, as illustrated in FIG. 5, and the remote control 180 having the transceiver 460 as illustrated in FIG. 4. The method can include sensing that an object is near a control during a time period, wherein sensing is performed by the remote control 180 (block 722 in FIG. 7). This portion of the method can be performed using any one or more of the embodiments as previously described with respect to sensing. The method can also include determining a state of the apparatus, wherein the apparatus is capable of being in at least one of a plurality of states (block 742). Logic within the control module 320 of the remote control 180, the control module 520 of the apparatus 120, or a combination thereof can be used to access a table or other data indicating the various states of the apparatus 120 based at least in part on which input or output device that is coupled to the apparatus 120 is active. The table may be kept in memory at the remote control 180, the apparatus 120, or a combination thereof. In a particular embodiment, the table having the state information is within the HD 580 of the apparatus 120.

The method can further include determining a specific function corresponding to the control, based at least in part on the state of the apparatus 120 (block 762). The control module 320 and the remote control 180 or the control module 520 and the apparatus 120 may perform this function based on the configuration of the remote control 180 or the apparatus 120. The same table as described with respect to determining the state of the apparatus (block 742) or a different table includes a listing of the controls and the different functions provided by the controls depending on the state. Similar to determining the state, logic within the control module 320 of the remote control 180, the control module 520 of the apparatus 120, or a combination thereof can be used to access the table to determine the specific function associated with the control. The table may be kept in memory at the remote control 180, the apparatus 120, or combination thereof. In one particular embodiment, the table having the state information is within the HD 580 of the apparatus 120. The method can still further include providing an audio signal, wherein the audio signal corresponds to an identifier of the specific function (block 782).

An example is provided to better illustrate how the method illustrated in the flow diagram of FIG. 7 is performed. In one embodiment, a double headed arrow and bar (“>>|”) control within the multimedia control section 260 (FIG. 2) of the remote control 180 may correspond to a fast-forward function that may terminate at the end of a tape if the input device 144 is a VCR. However, if the input device 144 is an audio CD player, the same control (>>|) may correspond to forward the audio CD player to the beginning of the next song. If the input device 144 is a DVD player, the same key can correspond to forward to the beginning of the next chapter. When the PC 162 is the only output device that is currently active, the multimedia control section 260 may be deactivated because the controls within the multimedia control section 260 may not be used by the PC 162. In other words, no function would correspond to the >>| control within the multimedia control section 260. In another embodiment, the multimedia control section 260 may be active when the PC 162 is active in order to operate a multimedia player on the PC 162.

The control module 320 within the remote control 180 or the control module 520 within the apparatus 120 can generate an audio signal that can be used by an audio system within the remote control 180, the apparatus 120, or an output device 166 coupled to the apparatus. The audio system can convert the audio signal into an audible signal that the user of the system 100 can understand. After hearing the audible signal, the user can determine whether to activate the function associated with that control. Any one or more of the predetermined activities previously described with respect to any disclosed embodiment may be performed. When the predetermined activity is performed an activation signal can be generated within the remote control 180 and sent to the apparatus 120.

A benefit regarding certain embodiments described herein is that an identifier of the control or an identifier of a function associated with the control, wherein the identifier is in the form of an audible signal, is provided to the user of the remote control 180 before an activation signal is sent from the remote control 180 to the apparatus 120. Therefore, the likelihood that a user will activate a control or function that he or she does not desire may be substantially reduced or even eliminated. In one embodiment, a user may place an object near a first control, wherein the object is sensed by the sensing module 304. An audible signal can be generated so that the user hears an identifier for the first control or function associated with the first control. Before the first control is activated, a user can determine he or she had the wrong control and then move the same or different object to a second control, which may be the control that the user initially desired. The second control or function associated with the second control may be announced (an audible signal) that the user can confirm corresponds to his or her selection. At this point, the user can activate the second control.

Figure 8:
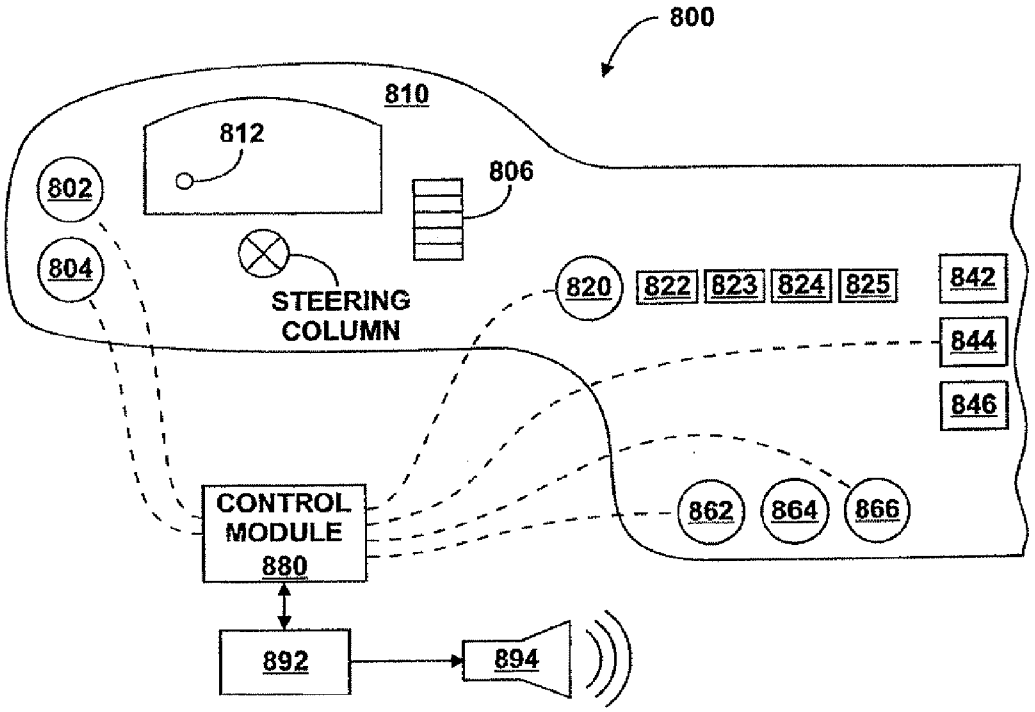
FIG. 8 includes a diagram of controls within an automobile.

The concepts described herein can be extended to other embodiments in which the user cannot or does not desire visual confirmation of one or more controls. In one embodiment, a user operating an automobile, a truck, aircraft, or other operating equipment may benefit from such an audible signal. FIG. 8 includes an illustration of a portion of an automobile 800 that includes a dashboard 810, a control module 880, and an audio system including an audio module 892 and a speaker 894. In one embodiment the audio system may be part of the automobile's audio system. The dashboard 810 includes lighting controls, such as a headlight control 802, a fog light control 804, and a panel light control 806. Above the steering column are gauges and an odometer reset control 812. The dashboard further includes audio controls, such as a volume adjust and on/off control 820, selectors 822, 823, 824, and 825 that may correspond to preset channels or a disk selector for an audio CD player (not illustrated) within the automobile 800. Controls 842, 844, and 846 may correspond to audio input selection. For example control 842 may correspond to an FM radio (not illustrated), control 844 may correspond to the audio CD player, and the control 846 may correspond to a tape player (not illustrated). Ventilation controls can include a vent selection control 862, a temperature control 864, and a fan speed control 866. Some of the signal connections between controls and the control module 880 are illustrated with dashed lines. Although not fully illustrated, each of the controls may be bi-directionally coupled to the control module 880. In a particular embodiment, the sensing module may be incorporated within the control module 880.

Figure 9:
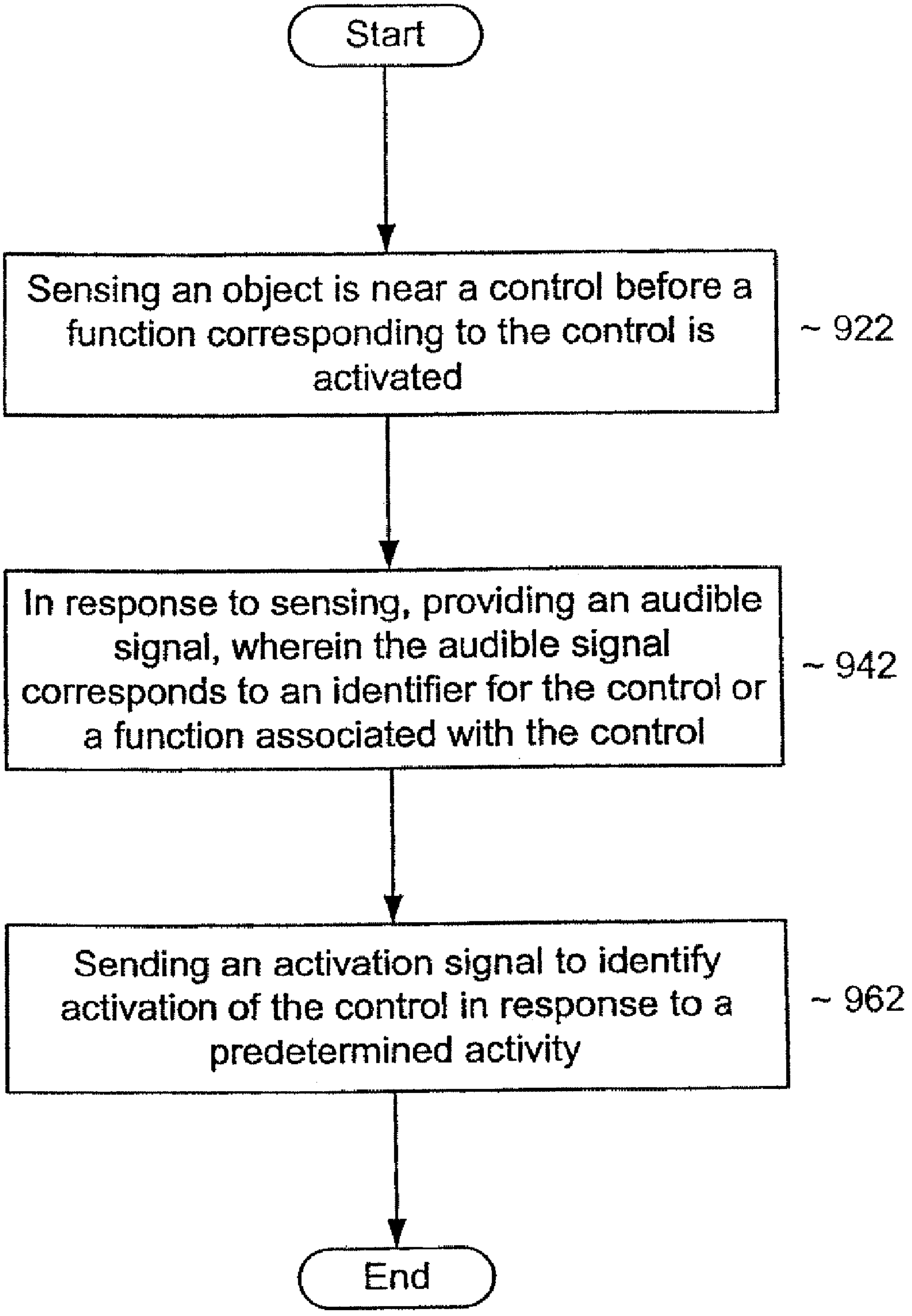
FIG. 9 includes a flow diagram of a method of using the controls of FIG. 8.

Similar to the prior embodiments, a control or a function associated with a control may be identified before an activation signal is generated. FIG. 9 includes a flow diagram of a method that may be performed when operating the automobile 800. The method includes sensing that an object is near a control before a function associated with the control is activated (block 922). The sensing may be performed as previously described. The method also includes, in response to sensing, providing an audible signal, wherein the audible signal corresponds to an identifier for the control or the function associated with the control (block 942). In one particular embodiment, a user of the automobile 800 may move an object close to or in contact with the headlight control 802. A sensing signal would be sent to or generated by the control module 880 indicating that an object is near the headlight control 802. In one embodiment, an audio signal can be generated by the control module 880 and sent to the audio module 892. The audio module 892 can provide a signal to the speaker 894 that announces "headlight controls" (as an audible signal).

The user may turn the headlight control 802 to a first position, which is construed by the control module 880 to be the parking lights for the automobile 800. The user may then turn the headlight control 802 to a second position, which is construed by the control module 880 to be the headlights. An audible signal may be generated after the user turns the headlight control 802 to the first position ("park lights" announced), the second position ("headlights" announced), or both.

The method can further include sending an activation signal to identify activation of the control in response to a predetermined activity (block 962). In one embodiment, activation may occur when the user pushes the knob for the headlight control 802 into the dashboard 810. In another embodiment, a different predetermined activity, such as any one or more of the predetermined activities previously described, may be used. By using a control panel that produces audible signals, a user can focus on driving or other visual tasks while operating the automobile 800 or other equipment without having to visually confirm that the correct control or position of the control has been selected.

While a focus of the flow diagrams (FIGS. 6, 7, and 9) have been on methods, after reading this specification, skilled artisans will appreciate that appropriate logic can be generated for the remote control 180, the apparatus 120, or both to perform part or all of the methods described herein. Skilled artisans will appreciate that they have many options regarding the design and use of the system 100. In one implementation, minimal interaction between the remote control 180 and the apparatus 120 may be desired. In another implementation, a significantly higher level of interaction between the remote control 180 and the apparatus 120 may be desired. Skilled artisans will be able to design the system 100 that meets the needs or desires of an equipment manufacturer, user of the system 100, another person or entity involved with the system 100 (service provider for the subscriber line 142), or any combination thereof.

Skilled artisans will appreciate that many other embodiments are possible. The embodiments described should be viewed as illustrative and not limiting to the scope of the present invention.

Note that not all of the activities described in the general description or the examples are required, that a portion of a specific activity may not be required, and that one or more further activities may be performed in addition to those described. Still further, the order in which activities are listed are not necessarily the order in which they are performed.

In the foregoing specification, the invention has been described with reference to particular embodiments. However, one of ordinary skill in the art will appreciate that one or more modifications or one or more other changes can be made without departing from the scope of the invention as set forth in the claims below. Accordingly, the specification and figures are to be regarded in an illustrative rather than a restrictive sense and any and all such modifications and other changes are intended to be included within the scope of invention.

Any one or more benefits, one or more other advantages, one or more solutions to one or more problems, or any combination thereof have been described above with regard to one or more particular embodiments. However, the benefit(s), advantage(s), solution(s) to problem(s), or any element(s) that may cause any benefit, advantage, or solution to occur or become more pronounced is not to be construed as a critical, required, or essential feature or element of any or all the claims.

What is claimed is:

1. A method comprising:

detecting that an agent is within a first proximate distance of a first control of a device, wherein the first proximate distance defines an activation threshold; and triggering a particular audible signal in response to detection of the agent within the first proximate distance of the first control;

wherein the particular audible signal identifies a particular function of the first control to which the first control is configured to operate, the particular function selected from a plurality of functions of the first control, the selection of the particular function based on an indication of a particular configured state of an apparatus selected from a plurality of configurable states of the apparatus, wherein the apparatus is remote from the device; and wherein the particular audible signal is selected from a plurality of audible signals, each of the plurality of audible signals identifying a corresponding function of the plurality of functions.

2. The method of claim 1, further comprising:

receiving a selection of a spoken language; and selecting at least a portion of the particular audible signal based at least in part on the selection of the spoken language.

3. The method of claim 1, further comprising:

receiving a user-defined audible message; and including at least a portion of the user-defined audible message in the particular audible signal.

4. The method of claim 1, wherein the indication is received at the device from the apparatus.

5. The method of claim 4, wherein the first control is an automobile control to control one or more functions that are associated with an automobile.

6. The method of claim 1, wherein the agent is detected to be within the particular proximate distance of the first control by using an optical sensor.

7. The method of claim 1, wherein the agent is detected to be within the particular proximate distance of the first control by detecting that an electrical property of a circuit satisfies a threshold value.

8. The method of claim 1, wherein the particular audible signal is emitted by an audio system, the audio system located within the device.

9. The method of claim 1, wherein the particular audible signal is emitted by an audio system, the audio system located within the apparatus.

10. A device comprising:

a detector to detect that an agent is within a first proximate distance of a first control of a device, wherein the first proximate distance defines an activation threshold; and a trigger to trigger a particular audible signal in response to detection that the agent is within the first proximate distance of the first control;

wherein the particular audible signal identifies a particular function of the first control to which the first control is configured to operate, the particular function selected from a plurality of functions of the first control, the selection of the particular function based on an indication of a particular configured state of an apparatus selected from a plurality of configurable states of the apparatus, wherein the apparatus is remote from the device; and wherein the particular audible signal is selected from a plurality of audible signals, each of the plurality of audible signals identifying a corresponding function of the plurality of functions.

11. The device of claim 10, wherein the detector includes an optical sensor, the optical sensor to detect a position of the agent with respect to the first control.

12. The device of claim 10, wherein the detector includes an electrical sensor, the electrical sensor to detect that an electrical property of a circuit satisfies a threshold value in response to a position of the agent being within the first proximate distance of the first control, and to detect that the electrical property of the circuit fails to satisfy the threshold value in response to the position of the agent being outside of the first proximate distance of the first control.

13. The device of claim 10, wherein the trigger is configured to trigger the particular audible signal prior to activation of the first control, wherein the activation causes the first control to perform the particular function.

14. The device of claim 10, further comprising an audio system, the audio system to emit the particular audible signal based that is selected.

15. The device of claim 10, wherein the apparatus includes an audio system, the audio system to emit the particular audible signal that is selected.

16. The device of claim 10, wherein the apparatus includes a memory device, the memory device storing one or more audio signals, wherein in response to the selection of the particular audible signal, a corresponding audio signal stored in the memory device is retrieved and converted into the particular audible signal prior to triggering the particular audible signal.

17. The device of claim 16, wherein the corresponding audio signal includes information that is converted to words that are included in the particular audible signal.

18. A non-transitory computer readable medium storing processor-executable instructions that when executed by a processor, cause the processor to:

detect that an agent is within a first proximate distance of a first control of a device, wherein the first proximate distance defines an activation threshold; and trigger a particular audible signal in response to detection of the agent within the first proximate distance of the first control;

wherein the particular audible signal identifies a particular function of the first control to which the first control is configured to operate, the particular function selected from a plurality of functions of the first control, the selection of the particular function based on an indication of a particular configured state of an apparatus selected from a plurality of configurable states of the apparatus, wherein the apparatus is remote from the device; and wherein the particular audible signal is selected from a plurality of audible signals, each of the plurality of audible signals identifying a corresponding function of the plurality of functions.

19. The computer-readable medium of claim 18, wherein the particular configured state of the apparatus is determined based at least in part upon data stored in a table.

20. The non-transitory computer readable medium of claim 18, wherein the indication of the particular configured state of the apparatus is received from the apparatus.

* * * * *